(12) United States Patent
Kawaura

(10) Patent No.: US 9,218,147 B2
(45) Date of Patent: Dec. 22, 2015

(54) CONDITIONALLY DISPLAYING ERRORS IN A PRINTING APPARATUS

(75) Inventor: Toshinori Kawaura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 13/218,943

(22) Filed: Aug. 26, 2011

(65) Prior Publication Data

US 2012/0050784 A1    Mar. 1, 2012

(30) Foreign Application Priority Data

Aug. 31, 2010    (JP) .................. 2010-194152

(51) Int. Cl.
*G06F 3/12* (2006.01)
*H04N 1/00* (2006.01)

(52) U.S. Cl.
CPC ............ *G06F 3/1255* (2013.01); *G06F 3/1207* (2013.01); *G06F 3/1234* (2013.01); *G06F 3/1259* (2013.01); *G06F 3/1284* (2013.01); *G06F 3/121* (2013.01); *G06F 3/1204* (2013.01); *G06F 3/1257* (2013.01)

(58) Field of Classification Search
CPC ..... G06F 3/1234; G06F 3/1257; G06F 3/121; H04N 1/00037; H04N 1/00002; H04N 1/00029

USPC ...................... 358/1.14, 1.15, 1.16; 399/8–17
See application file for complete search history.

(56) References Cited

U.S. PATENT DOCUMENTS

| 5,462,909 | A  | * | 10/1995 | Lakes et al. ................. | 503/201 |
| 7,148,979 | B1 | * | 12/2006 | Yanagawa .................... | 358/1.15 |
| 8,427,681 | B2 | * | 4/2013  | Kotake ........................ | 358/1.14 |
| 8,724,193 | B2 | * | 5/2014  | Otsuka ........................ | 358/505 |
| 2006/0017958 | A1 | * | 1/2006 | Jackson et al. .............. | 358/1.14 |
| 2009/0021790 | A1 | * | 1/2009 | Krovitz et al. .............. | 358/1.18 |

FOREIGN PATENT DOCUMENTS

| JP | 2007-060048 A | 3/2007 |
| JP | 2008-305142 A | 12/2008 |

* cited by examiner

*Primary Examiner* — Eric A Rust
(74) *Attorney, Agent, or Firm* — Canon USA Inc. IP Division

(57) ABSTRACT

An information processing apparatus that processes a job includes a determination unit configured to determine whether the job is a job in which print output is not performed by a printing apparatus, and a display unit configured to perform such control that information of occurrence of a first error in the printing apparatus is not displayed, if it is determined that the job is a job in which print output is not performed by the printing apparatus.

10 Claims, 15 Drawing Sheets

FIG.3

| KIND OF PAPER | COLOR/ MONOCHROME | BORDERLESS PRINTING | PRINT QUALITY | USABLE COATING METHOD FOR TRANSPARENT INK | PRINTING MODE NO. |
|---|---|---|---|---|---|
| PLAIN PAPER | COLOR | ON | STANDARD | AUTOMATIC | 1 |
| PLAIN PAPER | COLOR | OFF | STANDARD | AUTOMATIC | 2 |
| PLAIN PAPER | COLOR | ON | SPEED PRIORITY | AUTOMATIC | 3 |
| PLAIN PAPER | MONOCHROME | ON | STANDARD | AUTOMATIC | 4 |
| PLAIN PAPER | MONOCHROME | OFF | STANDARD | AUTOMATIC | 5 |
| PLAIN PAPER | MONOCHROME | ON | SPEED PRIORITY | AUTOMATIC | 6 |
| GLOSSY PAPER "A" | COLOR | ON | IMAGE QUALITY PRIORITY | AUTOMATIC, WHOLE SURFACE, USER SETTING | 7 |
| GLOSSY PAPER "A" | COLOR | ON | STANDARD | AUTOMATIC, WHOLE SURFACE | 8 |
| GLOSSY PAPER "A" | COLOR | OFF | IMAGE QUALITY PRIORITY | AUTOMATIC, WHOLE SURFACE, USER SETTING | 9 |
| GLOSSY PAPER "A" | COLOR | OFF | STANDARD | AUTOMATIC, WHOLE SURFACE | 10 |
| GLOSSY PAPER "A" | MONOCHROME | ON | STANDARD | AUTOMATIC, WHOLE SURFACE, USER SETTING | 11 |
| GLOSSY PAPER "A" | MONOCHROME | OFF | STANDARD | AUTOMATIC, WHOLE SURFACE, USER SETTING | 12 |
| GLOSSY PAPER "B" | COLOR | ON | IMAGE QUALITY PRIORITY | AUTOMATIC, WHOLE SURFACE, USER SETTING | 13 |
| GLOSSY PAPER "B" | COLOR | ON | STANDARD | AUTOMATIC, WHOLE SURFACE, USER SETTING | 14 |
| GLOSSY PAPER "B" | COLOR | OFF | IMAGE QUALITY PRIORITY | AUTOMATIC, WHOLE SURFACE, USER SETTING | 15 |
| GLOSSY PAPER "B" | COLOR | OFF | STANDARD | AUTOMATIC, WHOLE SURFACE, USER SETTING | 16 |
| GLOSSY PAPER "B" | MONOCHROME | ON | STANDARD | AUTOMATIC, WHOLE SURFACE, USER SETTING | 17 |
| GLOSSY PAPER "B" | MONOCHROME | OFF | STANDARD | AUTOMATIC, WHOLE SURFACE, USER SETTING | 18 |

FIG.12A

| FILE | |
|---|---|
| ERROR | COVER OPEN ERROR |
| | SETTING ERROR B |

| FILE | |
|---|---|
| ERROR | SETTING ERROR A |

| FILE | |
|---|---|
| ERROR | COVER OPEN ERROR |

1220, 12221

→

| FILE | |
|---|---|
| ERROR | |

| FILE | |
|---|---|
| ERROR | COVER OPEN ERROR |
| | SETTING ERROR A |

1230, 1231, 1232

→

| FILE | |
|---|---|
| ERROR | SETTING ERROR A |

| FILE | |
|---|---|
| ORDER OF PRIORITY | ERROR |
| 1 | SETTING ERROR A |
| 2 | COVER OPEN ERROR |
| ... | ... |

| FILE | |
|---|---|
| ORDER OF PRIORITY | ERROR |
| 1 | COVER OPEN ERROR |
| 2 | SETTING ERROR C |
| ... | ... |

1251, 1252, 1253

CONDITIONALLY DISPLAYING ERRORS IN A PRINTING APPARATUS

BACKGROUND OF THE INVENTION

1. Field of the Invention

The present invention relates to a technology for providing information concerning print processing to a user.

2. Description of the Related Art

Conventionally, there already exists a technology for notifying an error which has occurred in a printing apparatus, to a user in a status information display function (see e.g., Japanese Patent Application Laid-Open No. 2008-305142). According to Japanese Patent Application Laid-Open No. 2008-305142, acquiring and notifying information of the printing apparatus to a status information display unit, and causing the status information display unit to display the information, by a command transmission and reception unit of a printing control apparatus, is discussed. Furthermore, for a case where contents of a print command to be transmitted to the printing apparatus or setting information of the printing apparatus are inappropriately combined, a technique for temporarily stopping a transfer of the print command to the printing apparatus and notifying a setting error of the printing apparatus to the status information display unit is also discussed.

Usually, the printing control apparatus, upon receiving a print request from an application, generates a print command, and transmits the print command to the printing apparatus. On the other hand, there is a print request which does not require the printing control apparatus to transmit the print command. As an example thereof, there is a print request for form file creation. In a case where there is a problem with a print setting of the print request for form file creation, it is desired to notify as a priority an error of the print setting to a user. On the other hand, processing of the print request for form file creation is finalized inside the information processing apparatus, without generating the print command. For this reason, in performing processing of the print request for form file creation, there is an issue that, even if an error on the printing apparatus side is detected, the user does not want to display the error.

SUMMARY OF THE INVENTION

According to an aspect of the present invention, an information processing apparatus is an information processing apparatus that processes jobs, and includes a determination unit configured to determine whether a job is not a job in which print output is not performed by a printing apparatus, and a display unit configured, if it is determined that the job is a job in which print output is not performed by the printing apparatus, to perform such control that information of occurrence of a first error in the printing apparatus is not displayed.

According to another aspect of the present invention, an information processing apparatus is an information processing apparatus that processes jobs, and includes a first error detection unit configured to detect a occurrence of a first error in a printing apparatus, a second error detection unit configured to detect a second error related to one or more settings of the job, a determination unit configured to determine whether the job is a job in which print output is not performed by the printing apparatus, and a display unit configured, if the first error and the second error are detected, and it is determined that the job is a job in which print output is not performed by the printing apparatus, to perform such control that information of the second error is displayed with priority over information of the first error.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a printing mode table relating to a transparent ink coating mode.

FIGS. 12A, 12B, 12C, 12D, 12E, and 12F illustrate error information described in files.

DESCRIPTION OF THE EMBODIMENTS

Various exemplary embodiments, features, and aspects of the invention will be described in detail below with reference to the drawings.

The exemplary embodiments described below are not intended to limit the present invention according to claims, and all of combinations of features described in the present exemplary embodiments are not necessarily essential for a solving means of the present invention.

Figure 1:
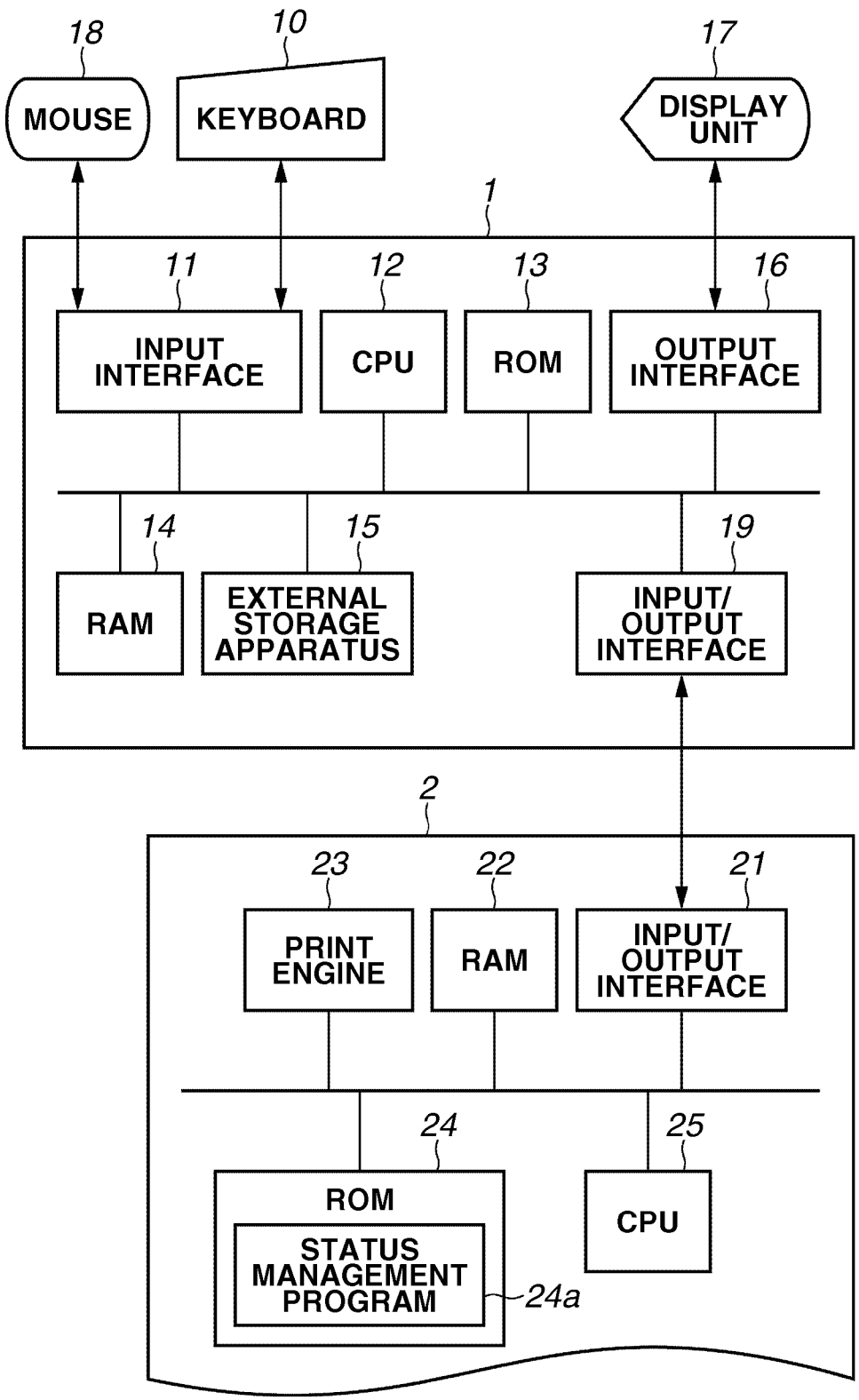
FIG. 1 is a block diagram illustrating a configuration of a printing system constituted of a printing apparatus and an information processing apparatus connected to the printing apparatus.

A configuration of a printing system including a printing apparatus (printing apparatus 2) according to the present first exemplary embodiment and an information processing apparatus (personal computer 1) connected to the printing apparatus will be described with reference to the block diagram in FIG. 1. FIG. 1 illustrates the printing system including the printing apparatus 2 and the personal computer 1 connected to the printing apparatus 2 as one exemplary embodiment of the present invention. The personal computer 1 includes an input interface 11 and a central processing unit (CPU) 12, a read-only memory (ROM) 13, a random-access memory (RAM) 14, an external storage apparatus 15, an output interface 16, a display unit 17, a keyboard 10, a mouse 18, and an input/output interface 19. An initialization program is contained in the ROM 13, and various types of data of an application program group, an operating system (OS), a printer driver and others are stored in the external storage apparatus 15. The RAM 14 is a memory which various types of programs stored in the external storage apparatus 15 use as a work memory.

In the present exemplary embodiment, the functions described below in the personal computer 1 and the processing associated with the flowcharts described below are implemented by the CPU 12 performing the processing in accordance with a procedure of a program stored in the ROM 13 or the like.

The printing apparatus 2 includes an input/output interface 21, a RAM 22, a print engine 23, a ROM 24, and a CPU 25. The input/output interface 21 is connected to the input/output interface 19 of the personal computer 1. In the present exemplary embodiment, a connection interface is assumed to be a universal serial bus (USB) (registered trademark), but it is acceptable whatever the interface. Further, an expansion option which expands the functions of the printing apparatus 2 can be also connected to the input/output interface 21.

The RAM 22 is used as a main memory and a work memory of the CPU 25, and is used as a reception buffer for temporarily storing the received print job, and stores various types of data therein. The print engine 23 performs printing based on the data stored in the RAM 22.

In the ROM 24, various types of control programs such as a status management program 24a, and data which respective control programs use are contained, and the CPU 25 controls respective units of the printing apparatus 2 according to these control programs. The status management program 24a is a program for monitoring a state of the printing apparatus 2 on the basis of information of various types of sensors (not illustrated) arranged inside the printing apparatus 2, and creating status information, and storing it in the RAM 22.

Herein, process sharing of the personal computer 1 and the printing apparatus 2 has been shown as described above by way of an example, but it is not limited to especially this sharing configuration and other configurations are also acceptable.

Figure 2:
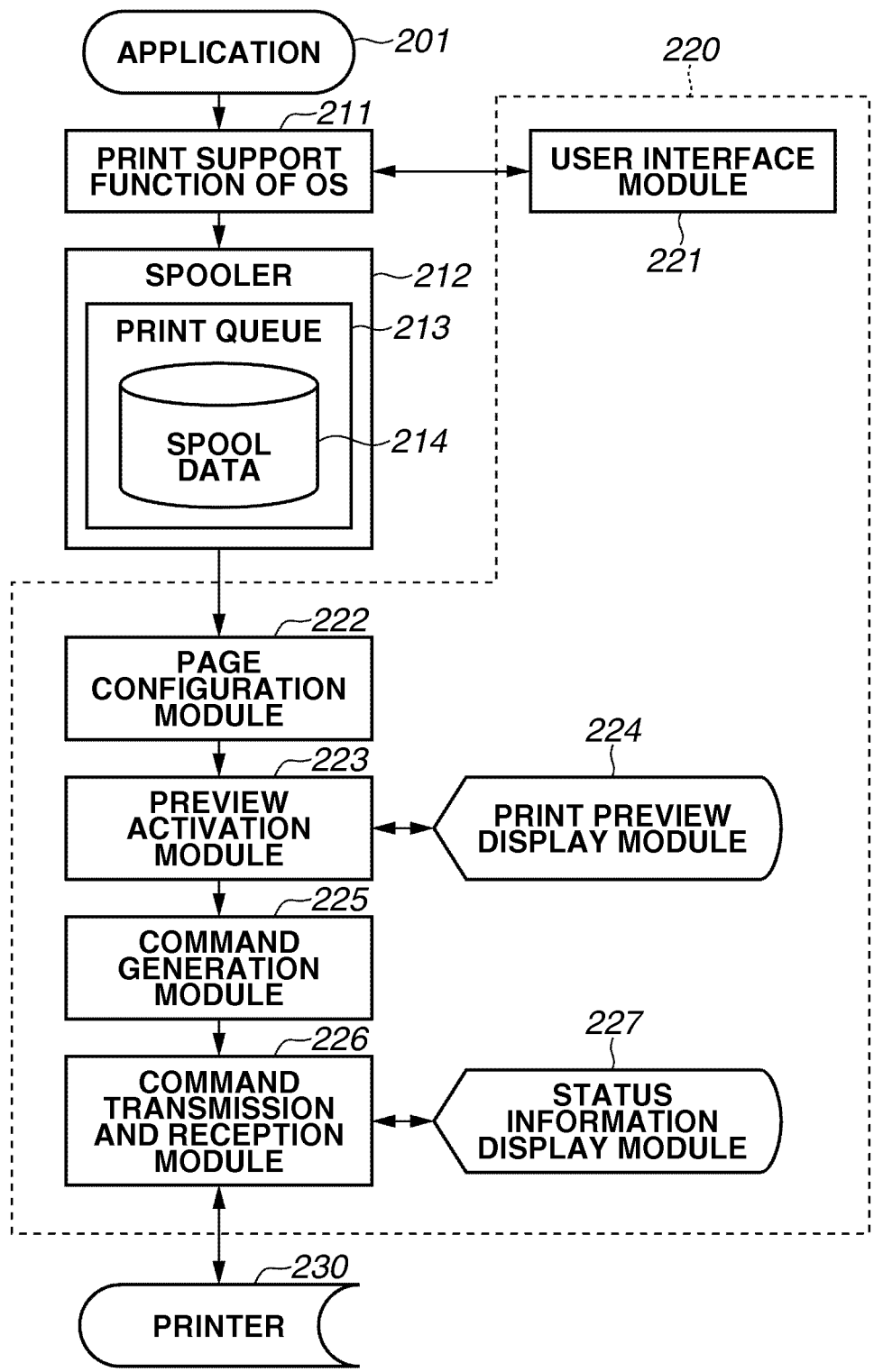
FIG. 2 is a block diagram illustrating a configuration of a printer driver.

FIG. 2 is an example of a block diagram conceptually represented focusing on a printer driver 220 to explain a configuration of the printer driver in the present exemplary embodiment. Print data created by an application 201 is temporarily accumulated in a print queue 213 of a spooler 212 as spool data 214 via a print support function 211.

The spool data 214 is managed by the spooler 212 as a print job with names and the like added. The print job is supplied to the printer 230 and printed there, after having been converted into a print command which a printer 230 (an example of the printing apparatus 2) can interpret using the printer driver 220. The application 201 adds the print setting information returned from a user interface module 221 to the print job via the print support function of OS 211, when performing print instruction. The print setting information is information which has been set in advance, before print start instruction from the application 201 is issued.

A print job passed to the printer driver 220 is first processed by a page configuration module 222. The page configuration module 222 performs page configuration processing with respect to the print job, such as rearranging pages of the print job according to print setting information, bringing together a plurality of pages into one page.

Next, the print job is passed to a preview activation module 223. The preview activation module 223, if an instruction to display print preview information is given in the print setting information, calls a print preview display module 224. The print preview display module 224 displays a print preview screen on the display unit 17 of the personal computer 1, and provides a means for allowing a user to check a print result in advance. If an instruction to display print preview information is not given in the print setting information, the preview activation module 223 passes the print job to the command generation module 225.

The command generation module 225 converts print data of the print job into print commands which the printer 230 can interpret according to the print setting information. The print commands are transmitted to the printer 230 in sequence by the command transmission and reception module 226. Furthermore, the command transmission and reception module 226 reads out a state of the printer 230 such as information that an error of the printer 230 has occurred, or page information of current printing, and passes it to a status information display module 227. The status information display module 227 analyzes a state of the printer 230, displays a status information display screen (not illustrated) which displays information of the printer 230 on the display unit 17 of the personal computer 1, and provides a means for allowing a user to check a state of the print job or a state of the printer 230.

In the present exemplary embodiment, an example in which the status information display module 227 displays the status information display screen to notify the information to the user is described, but it is not limited to this. For example, the status information display module 227 only performs state analysis or the like of the printer 230, and the processing of conveying the information to the user using the information display screen may be performed using a print support function of the OS.

The printer 230 uses transparent ink besides color inks such as cyan, magenta, yellow, and black (CMYK). The transparent ink is used for the purposes of homogenization of gloss feeling of images, and expansion of color gamut, and it is also possible to obtain decoration effect by not performing coating on a specific region.

The printer driver 220 has, as a coating method for the transparent ink, three modes of a whole surface coating mode, an automatic coating mode, and a user setting mode. The whole surface coating mode is a mode to apply the transparent ink in an entire printing range of a printing medium. The automatic coating mode is a mode of not applying the transparent ink on a printing medium which involves no transparent ink, and applying the transparent ink on a printing medium which involves the transparent ink in a region other than white point region among print data. More specifically, the automatic coating mode is a mode for switching according to whether to apply the transparent ink depending on a setting value of job setting of a printing medium type.

The user setting mode is a mode for providing designability to a printing result on the printing medium by not partly applying the transparent ink to change appearance, and is composed of two modes, i.e., a form file creation mode and a form combination printing mode. The form file creation mode is a mode for creating a region where the transparent ink is not applied (transparent ink removed region), and storing it as a form file. The form combination printing mode is a mode for executing print without applying the transparent ink, on only a designated region of the transparent ink removed region included in the selected form file. In the present exemplary embodiment, print processing for enhancing decoration of print output products using a specific ink (especially, the transparent ink) is realized by using a form for identifying a print region of the specific ink. It is conceivable to perform similar decoration with color inks other than the transparent ink such as silver ink.

Further, usable transparent ink coating modes differ for each printing mode determined by a combination of the print settings, and are classified into three categories as follows. The details of the printing modes will be described below. The three categories include a printing mode in which "automatic coating mode"/"whole surface coating mode"/"user setting mode (form file creation mode/form combination printing mode)" are possible, a printing mode in which "automatic coating mode"/"whole surface coating mode" are possible, and a printing mode in which only "automatic coating mode" is possible.

The printing mode in which only "automatic coating mode" is usable is a printing mode in which the transparent ink is not applied. In a printing medium in which the effect of the transparent ink is minimal, including a plain paper or matte coated printing medium, a method of a color conversion, or print control is designed on the precondition that the transparent ink is not used. As a result, only the "automatic coating mode" is usable as the transparent ink coating mode. In this case the "automatic coating mode" will represent that "the transparent ink is not applied".

On the other hand, as to a type of a printing medium which can obtain an effect, such as homogenization of gloss feeling, by using the transparent ink, the "automatic coating mode" and the "whole surface coating mode", in which the transparent ink is applied, become usable. In a case of these paper sheets type, whether the "user setting mode" is usable differs depending on the printing modes. This is because in the printing mode in which it is difficult to produce decoration effect by using the transparent ink such as a printing mode in which priority is given to speed, only the "automatic coating mode" and the "whole surface coating mode" are made usable. Accordingly, in the printing mode in which it is difficult to obtain the decoration effect, a problem that a suitable print result cannot be obtained when using the user setting mode is prevented from occurring.

A printing mode table 301 in FIG. 3 is an example of the printing mode table which retains information concerning usable transparent ink coating mode for each printing mode. For example, a printing mode (7) of "glossy paper A, color, borderless print ON, image quality priority", represents that the automatic coating mode, the whole surface coating mode, and the user setting mode are all usable. Further, a printing mode (8) of "glossy paper A, color, borderless print ON, standard" represents that only the automatic coating mode, and the whole surface coating mode are usable.

The methods of the color conversion, and the print control are thus determined according to setting values covering from type of printing medium as a higher level setting item, to print quality as a lower level setting item. Therefore, in the present exemplary embodiment, each one of combinations of these setting values is called a printing mode.

Figure 4:
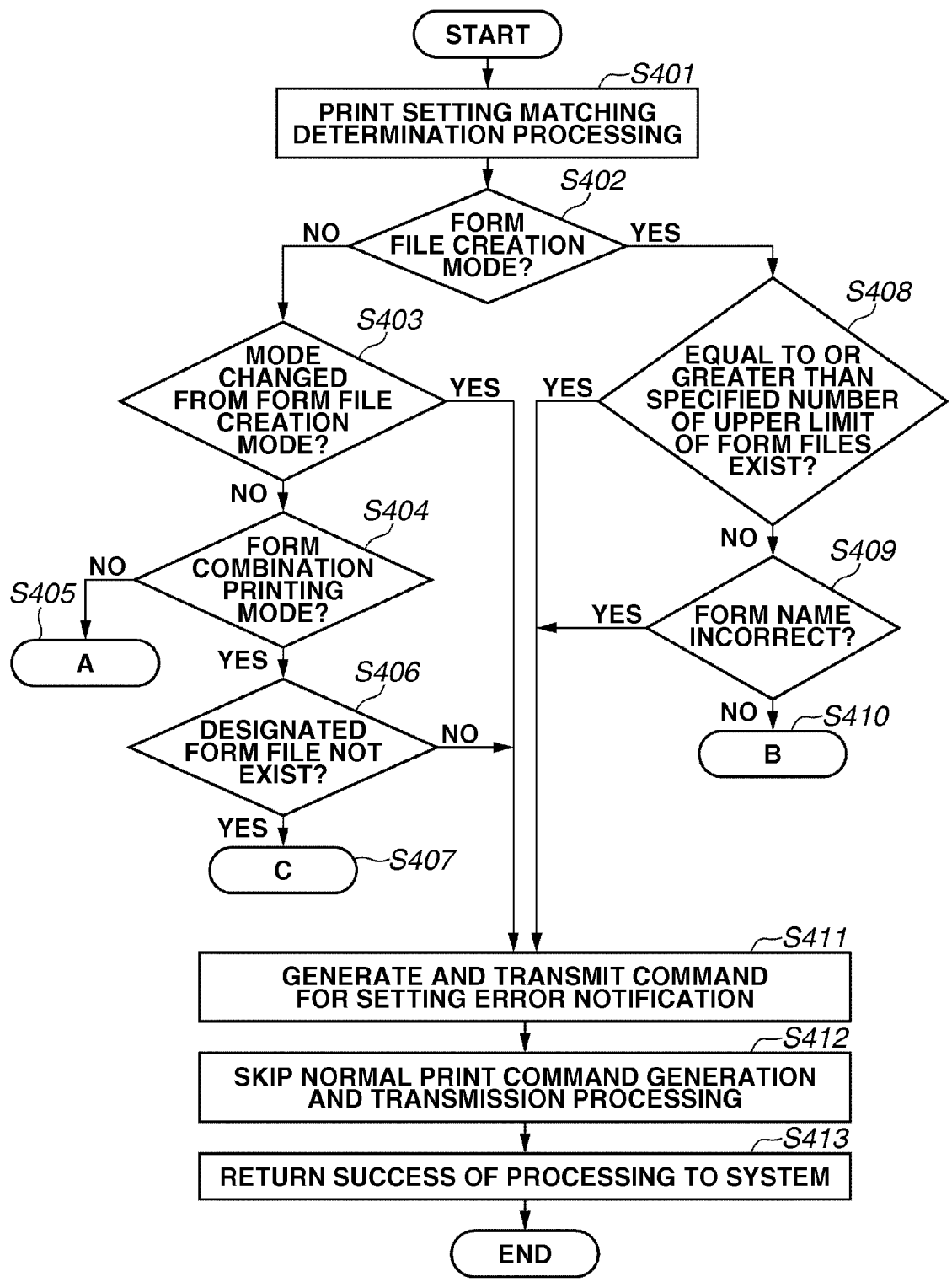
FIG. 4 is a flowchart illustrating processing centering on setting error determination processing of a command generation module.
Figure 5:
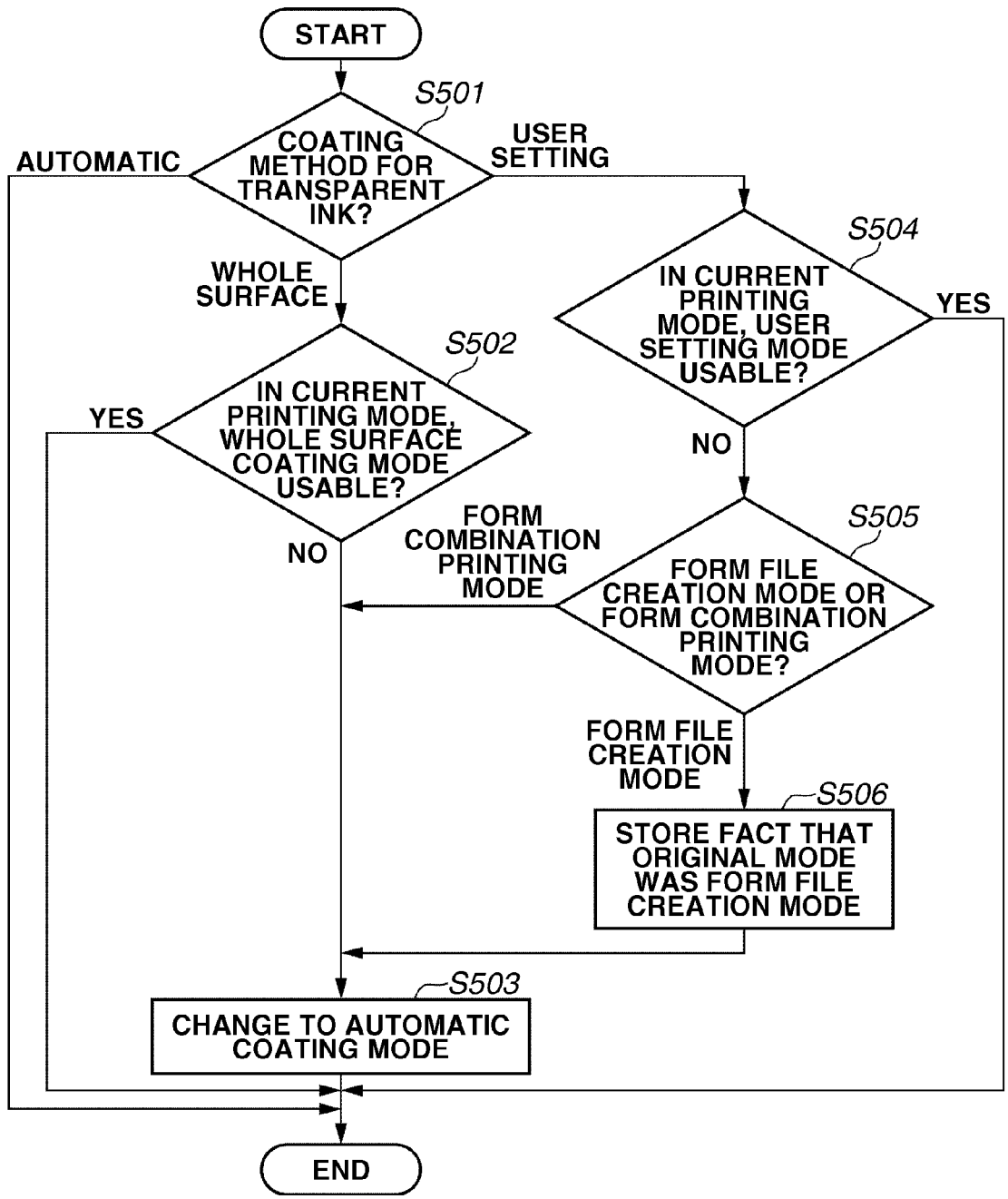
FIG. 5 is a flowchart illustrating print setting matching determination processing of the command generation module.

Hereinbelow, referring to FIGS. 4 and 5, processing of the command generation module 225 will be described. FIG. 4 is a flowchart illustrating processing centering on setting error determination relating to the transparent ink coating mode, by the command generation module 225. In step S401, the command generation module 225 performs print setting matching determination processing. More specifically, when printing is instructed, the command generation module 225 refers to print setting information in a print job, determines presence or absence of a mismatch (unusable combination is set) among setting items and changes setting values of some items.

Here, referring to FIG. 5, the print setting matching determination processing (step S401) by the command generation module 225 will be described in detail. In step S501, the command generation module 225 first refers to the setting value of the transparent ink coating mode in the print setting information. The command generation module 225 terminates matching determination processing, because if the setting value of the transparent ink coating mode is set to the automatic coating mode, the automatic coating mode is usable in all of the printing modes, and thus no mismatches exist.

In step S502, if the transparent ink coating mode is set to the whole surface mode, the command generation module 225 determines with reference to the printing mode table 301 whether the whole surface coating mode is usable, in a printing mode corresponding to a current print setting. If the whole surface coating mode is usable as a result of the determination (YES in step S502), the command generation module 225 terminates the processing as it is, since no mismatches exist. If it is determined that the whole surface coating mode cannot be used in the set printing mode (NO in step S502), then in step S503, the command generation module 225 changes the transparent ink coating mode to the automatic coating mode, and terminates the processing.

In step S504, if a setting value of the transparent ink coating mode is the user setting mode, the command generation module 225 determines with reference to the printing mode table 301, whether the user setting mode is usable, in a printing mode corresponding to a current print setting. If the user setting mode is usable as a result of the determination (YES in step S504), the command generation module 225 terminates the processing as it is, since no mismatches exist.

If it is determined that the user setting mode cannot be used in the printing mode being set (NO in step S504), then in step S505, the command generation module 225 further determines whether to select the form file creation mode or the form combination printing mode of the user setting mode.

If the form combination printing mode (FORM COMBINATION PRINTING MODE in step S505) is selected, then in step S503, the command generation module 225 changes the transparent ink coating mode to the automatic coating mode, and terminates the processing. If the form file creation mode (FORM FILE CREATION MODE in step S505) is selected, then in step S506, the command generation module 225 stores in the RAM 14 the fact that the original mode in the print setting was the form file creation mode. Thereafter, in step S503, the command generation module 225 changes the transparent ink coating mode to the automatic coating mode, and terminates the processing.

Next, processing of the determinations in step S402 and later in the flowchart in FIG. 4 will be described. In step S402, the command generation module 225 refers to the print setting changed as needed according to the processing step S401, and determines whether the print setting is set to the form file creation mode. If it is determined that the print setting is not set to the form file creation mode in the determination in step S402 (NO in step S402), then in step S403, the command generation module 225 refers to the information stored in the RAM 14 in step S506, and determines whether the transparent ink coating mode has been changed from the form file creation mode in step S401.

The command generation module 225, upon determining that the transparent ink coating mode has been changed (YES in step S403), executes error display processing in step S411 and later. In step S411 and later, the command generation module 225 informs the subject error information to the user, and does not implement print and form creation processing. The processing in step S411 and later (an example of display control processing) will be described below.

If the command generation module 225 determines that the transparent ink coating mode has been changed from the form file creation mode in the determination in step S403, the process is taken as an error to avoid consumption of useless printing medium by the user's unexpected print processing. While form files are only generated and printing is not performed in the form file creation mode, printing will be performed, if change to another mode is made and continued in step S401. A user who has designated the form file creation does not desire that output processing onto a printing medium will be performed, and occurrence of unexpected print processing results in a useless consumption of the printing medium, which is undesirable.

If it is determined that the transparent ink coating mode has not been changed from the form file creation mode in the determination in step S403 (NO in step S403), then in step S404, the command generation module 225 determines whether the transparent ink coating mode is set to the form combination printing mode. If it is determined that the transparent ink coating mode is not set to the form combination printing mode in the determination in step S404 (NO in step S404), then in step S405, the command generation module 225 performs ordinary print processing which does not use form files. The details of step S405 will be described below using a separate flowchart.

If it is determined that the transparent ink coating mode is set to the form combination printing mode in the determination in step S404 (YES in step S404), then in step S406, the command generation module 225 determines whether a designated form file exists in the print setting. The form file is designated by an operation of input device such as the mouse 18, or the keyboard 10 by a user (user operation). If the designated form file exists (NO in step S406), then in step S407, the command generation module 225 performs form combination print processing using the form file. The details of step S407 will be described below using a separate flowchart. If the designated form file does not exist (YES in step S406), the command generation module 225 executes error display processing in step S411 and later.

If it is determined to be the form file creation mode in the determination in step S402 (YES in step S402), then in step S408, the command generation module 225 checks whether equal to or greater than the specified number of upper limit of form files exist. If they exist (YES in step S408), the command generation module 225 executes error display processing in step S411 and later. The purpose of the determination in step S408 is to avoid tightness of the external storage apparatus 15, which is attributed to the generation of a great amount of form files.

If equal to or greater than a specified number of upper limit of form files do not exist (NO in step S408), then in step S409, the command generation module 225 checks form name in the print setting information, and determines whether correct form name is designated. The purpose of the determination in step S409 is to avoid the generation or overwrite of unintended form files. If there are no blanks in the form names, and existing form files having identical names do not exist, the command generation module 225 determines that the designated form name is normal.

If the form name is normal (NO in step S409), then in step S410, the command generation module 225 performs form file creation processing. The processing in step S410 will be described below. If the form name is incorrect (YES in step S409), the command generation module 225 executes error display processing in step S411 and later.

Finally, the error display processing in step S411 and later will be described which is executed if either one of four conditions in the flowchart in FIG. 4 is satisfied. First, in step S411, the command generation module 225 generates a setting error notification command for notifying that a setting error has occurred, and transmits the command to the command transmission and reception module 226.

The command transmitted by the command generation module 225 usually reaches the printer 230 via the command transmission and reception module 226. However, the command transmission and reception module 226, upon receiving the setting error notification command, performs processing for notifying that the setting error has occurred, without transmitting it to the printer 230. The detailed processing of the command transmission and reception module 226 will be described below.

As illustrated in the flowchart in FIG. 4, the command generation module 225 will never transmit another print command, before transmitting the setting error notification command in step S411. In other words, if a setting error has occurred, every command does not reach the printer 230, throughout the processing of the entire print job. Accordingly, at the time of occurrence of the setting error, the command generation module 225 can avoid the printer 230 from unnecessarily performing initialization operation. Depending on a state of the printing system, the print command which the command generation module 225 has transmitted may reach the printer 230, without passing through the command transmission and reception module 226. The setting error notification command is configured as a command for causing the printer 230 not to incorrectly operate on that occasion.

Here, using FIG. 14, data structure of a setting error notification command 1400 will be described. A start of command is denoted by a <command> element 1401. A target which the command controls is denoted by a <controlmode="driver"> element 1402. An attribute value, driver, is set to mode attribute of control tag. In other words, it indicates that this command is a command for controlling the driver. Notification content is specifically written by a <notify>element 1403. An Error Code 1 (1404) is set to data of the <notify>element 1403. The command transmission and reception module 226, upon receiving the Error Code 1(1404), recognizes it as a setting error.

For data of the element 1403, an Error Code corresponding to a content of the error is set by the command generation module 225, and is referred to in order to recognize an error type in the command transmission and reception module 226. In the present exemplary embodiment, the command generation module 225 sets and transmits corresponding Error Code depending on which error condition of the determinations shown in steps S403, S406, S408, and S409 has been satisfied.

After transmitting the setting error notification command in step S411, then in step S412, the command generation module 225 skips all ordinary print command generation processing and transmission processing. In a case of a printing system in which the command generation module 225 actively acquires pages while print job is being executed, this skip processing is carried out by not implementing all processing from acquisition of the pages to generation of the command.

After skipping all the print command generation processing, in step S413, the command generation module 225 returns information representing success of the processing to the spooler 212 (system). In other words, the command generation module 225 terminates the processing, as having been successful in the generation of the commands for setting error notification, although the print command generation processing has been internally skipped.

Here, even if the commands for setting error notification are still retained by the spooler 212, the spooler 212 transmits the setting error notification command to the command transmission and reception module 226 when receiving information representing the success. Accordingly, it is assured that the setting error notification command surely reaches the command transmission and reception module 226.

The command which the command generation module 225 has transmitted, usually, reaches the command transmission and reception module 226 via the spooler 212. Usually, in the event that an error has occurred which makes it impossible to continue the process by the command generation module 225, the command generation module 225, after interrupting the print command generation processing, returns the information representing failure of the processing to the spooler 212. Accordingly, suspension of the processing is notified to other modules of the printer driver 220, and the print job can be promptly suspended.

In this case, however, it is not assured that print commands, which the command generation module 225 has transmitted before suspending the processing, all reach the command transmission and reception module 226. As illustrated in step S413, it can be assured that print commands, which the command generation module 225 has transmitted, reach the command transmission and reception module 226, by returning information representing success to the system.

More specifically, the command generation module 225 returns the information representing the success to the system in step S413, thereby enabling to assure that the setting error notification command reaches the command transmission and reception module 226. Accordingly, by the processing of the command transmission and reception module 226 described below, an exact stoppage of the print job can be performed utilizing a mechanism of the spooler 212. Since ordinary print command generation, and transmission processing are skipped in step S412, the print job is promptly terminated, after the print job is stopped and terminated by the command transmission and reception module 226.

Figure 6:
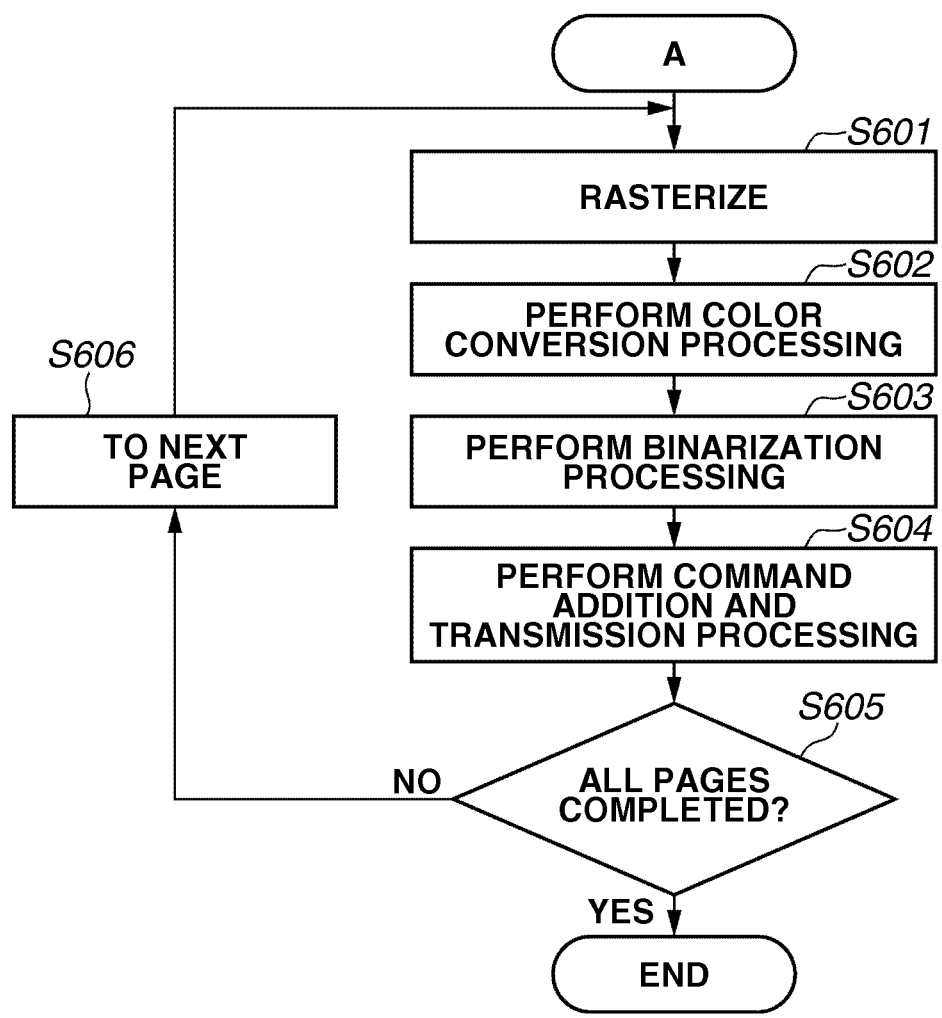
FIG. 6 is a flowchart illustrating ordinary print processing of the command generation module.

Using FIG. 6, print processing without using the form file which the command generation module 225 implements in step S405 will be described in detail.

First, in step S601, the command generation module 225 performs rasterization on the basis of the print job of current pages, and creates multivalued raster data. The rasterize processing may be also implemented by utilizing either a program which the printer driver 220 provides, or a function which the OS provides. Next, in step S602, the command generation module 225 performs color conversion processing. The color conversion processing includes conversion processing into color space which relies on the printer 230, color converting processing from RGB (red, green, blue) system data of an input system expressed with luminance signals into CMYK system data of an output system for expressing with density signals, and other processing. In accordance with print settings relating to the transparent ink coating method, generation of transparent ink plane is also performed by a method suitable for either "automatic", or "whole surface".

Next, in step S603, the command generation module 225 performs binarization processing, for quantizing the CMYK system data into 1-bit data for each color. Then, in step S604, the command generation module 225 performs conversion into, and transmission of the print commands which the printer 230 can interpret. The transmitted print commands reach the printer 230, via the command transmission and reception module 226, and the printer 230 form an image corresponding to the received print commands on a printing medium. Finally, in step S606, the command generation module 225 determines whether all pages are completed in step S605, and advances the process to the next page if there are the remaining pages. When there are no remaining pages, the command generation module 225 terminates the processing.

Using FIG. 7, the form file creation processing which the command generation module 225 performs in step S410 will be described in detail. A structure of the form files will be described below. First, in step S701, the command generation module 225 refers to a specified location in the external storage apparatus 15 as an example of a storage unit, and removes form files which exist in an incomplete form, if any. The purpose of the processing is to remove incomplete form files which remain in a case where incorrect termination is performed halfway through the form file creation processing. Next, in step S702, the command generation module 225 creates empty form file in the specified location for creating a form file in the external storage apparatus 15, and in step S703, writes a job header on the created form file.

Figure 11A:
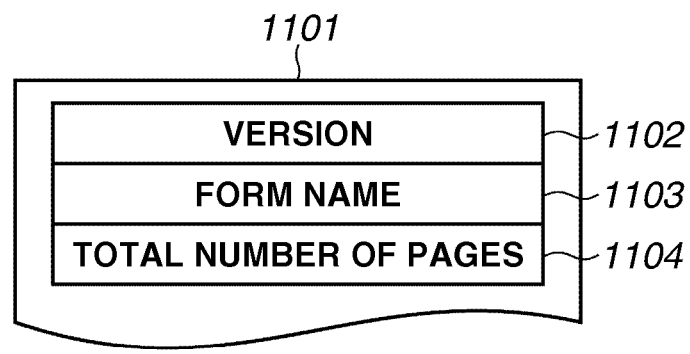
FIGS. 11A, 11B, and 11C illustrate data structures of form files.

Here, a structure of the job header will be described in detail with reference to FIG. 11A. A job header 1101 is composed of a version 1102, a form name 1103, and a total number of pages 1104. The version 1102 represents version information relating to a format of the form file. The form name 1103 represents a name of the form file, and the form name subjected to correct or incorrect determination in step S409 is stored therein. The total number of pages 1104 represents a number of pages of the transparent ink removed region information existing in the form file, and is stored in step S709 described below.

After writing the job header, then in step S704, the command generation module 225 checks whether a page having the identical transparent ink removed region exists in the form file. If the command generation module 225 recognizes that a second copy and later of printing multiple copies are being processed, it may determine that the identical transparent ink removed region already exists. If the identical transparent ink removed region already exists (YES in step S704), then in step S705, the command generation module 225 writes a page header containing information which refers to existing pages, and terminates the processing on the current page. By this processing, the form file creation processing can be completed at a high speed, and a size of the form files can be made smaller as well. If the identical transparent ink removed region does not exist (NO in step S704), then in step S706, the command generation module 225 writes the page header.

Figure 11B:
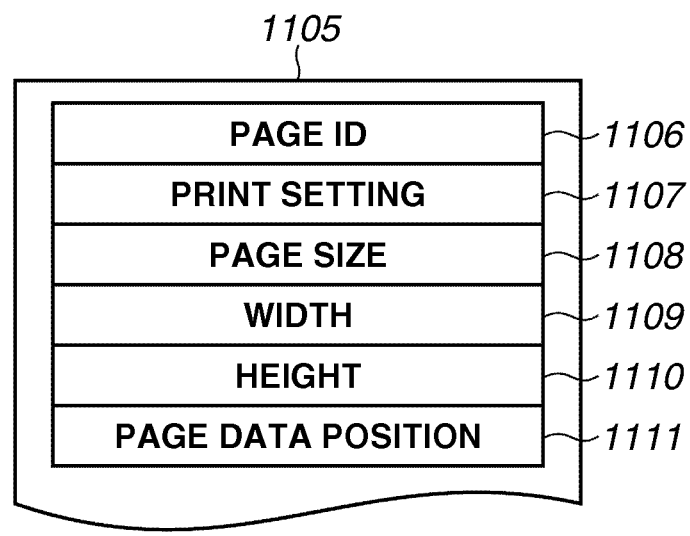

A structure of the page header will be described in detail with reference to FIG. 11B. A page header 1105 is composed of a page identifier (ID) 1106, a print setting 1107, a page size 1108, a width 1109, a height 1110, and a page data position 1111. The page ID 1106 is a value for uniquely identifying the page. The print setting 1107 is various types of print settings at the time of print execution in the form file creation mode. The print setting 1107 includes information concerning a size of printing medium, an orientation of printing and the like, and the print settings 1107 is referred to by the user interface module 221, when a form file list is displayed.

The page size 1108 represents in a byte unit a size of the transparent ink removed region which the page header refers to. The width 1109 and the height 1110 represent in a pixel unit a width and a height of the transparent ink removed region which the page header refers to. The page data position 1111 represents a position of the ink removed region which the page header refers to, and an offset position from the front end of the form file is stored therein.

After writing the page header in step S706, then in step S707, the command generation module 225 performs rasterization on the basis of the print job of the current page to create multivalued raster data. In step S708, the command generation module 225 binarizes the multivalued raster data to create binary raster data.

Here, in the multivalued raster data, a region of pure white is binarized as '1' and a region other than pure white as '0'. In step S709, the command generation module 225 writes the binary raster data thus created into the form file. The binary raster data represents transparent ink removed region information in the current page, and the transparent ink is not applied in the region of '0' at the time of form combination printing. In this way, the regions other than pure white are regarded as the transparent ink removed region which the user designates as a form region and all regions other than pure white are stored as '0'.

In step S710, the command generation module 225 checks whether the remaining pages exist. If the remaining pages exist (NO in step S710), then in step S711, the command generation module 225 refers to the next page, and returns to the step S704. In step S712, if there are no remaining pages, the command generation module 225 updates the number of pages to be stored in the job header, which is final information.

Simultaneously with step S712, the command generation module 225 adds information indicating that the form file creation has been normally completed. The information may be included in the job header, or the fact that the form file creation has been normally completed may be expressed by giving a particular name to the form file. Alternatively, the fact that the form file creation has been normally completed may be expressed by separately creating a management list which stores information concerning normally created form files in a list format, and by appending the information to the management list. A form file not having information, which is added in step S712 and indicates that the form file creation has been normally completed, is removed as an incomplete form file in step S701, at the time of the next form file creation. Finally, in step S713, the command generation module 225 closes the form file, and terminates the form file creation processing.

Figure 11C:
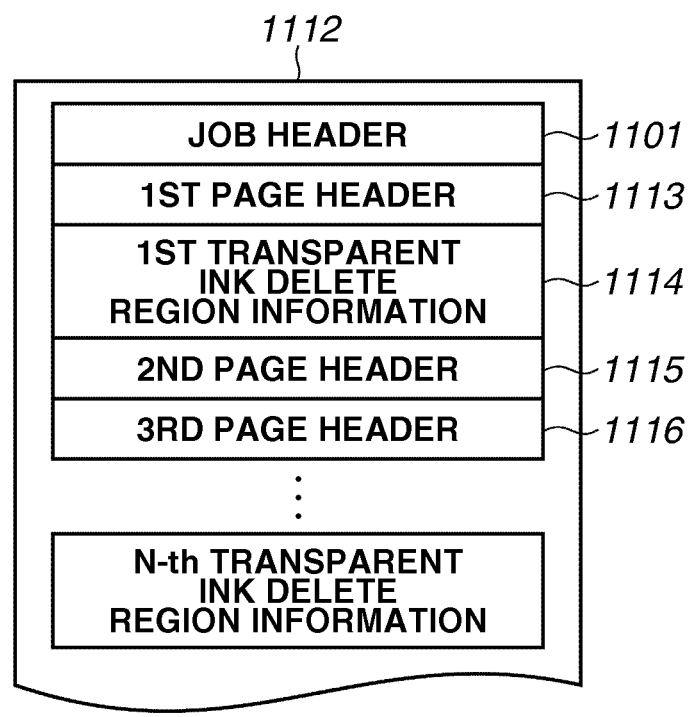

As described above, upon receiving the print job of the form file creation mode, the command generation module 225 creates a form including the transparent ink removed region information, as an external file in the external storage apparatus 15, without supplying the print command to the printer 230. An example of thus generated form file will be described in detail with reference to FIG. 11C.

At the front end of the form file 1112, there is the job header 1101 to be added in step S703. Next, a $1^{st}$ page header 1113, and a $1^{st}$ transparent ink removed region information 1114 come. In the page data position 1111, a front-end position of the $1^{st}$ transparent ink removed region information 1114 is stored as one of elements of the $1^{st}$ page header 1113. Next, a $2^{nd}$ page header 1115 comes.

Figure 7:
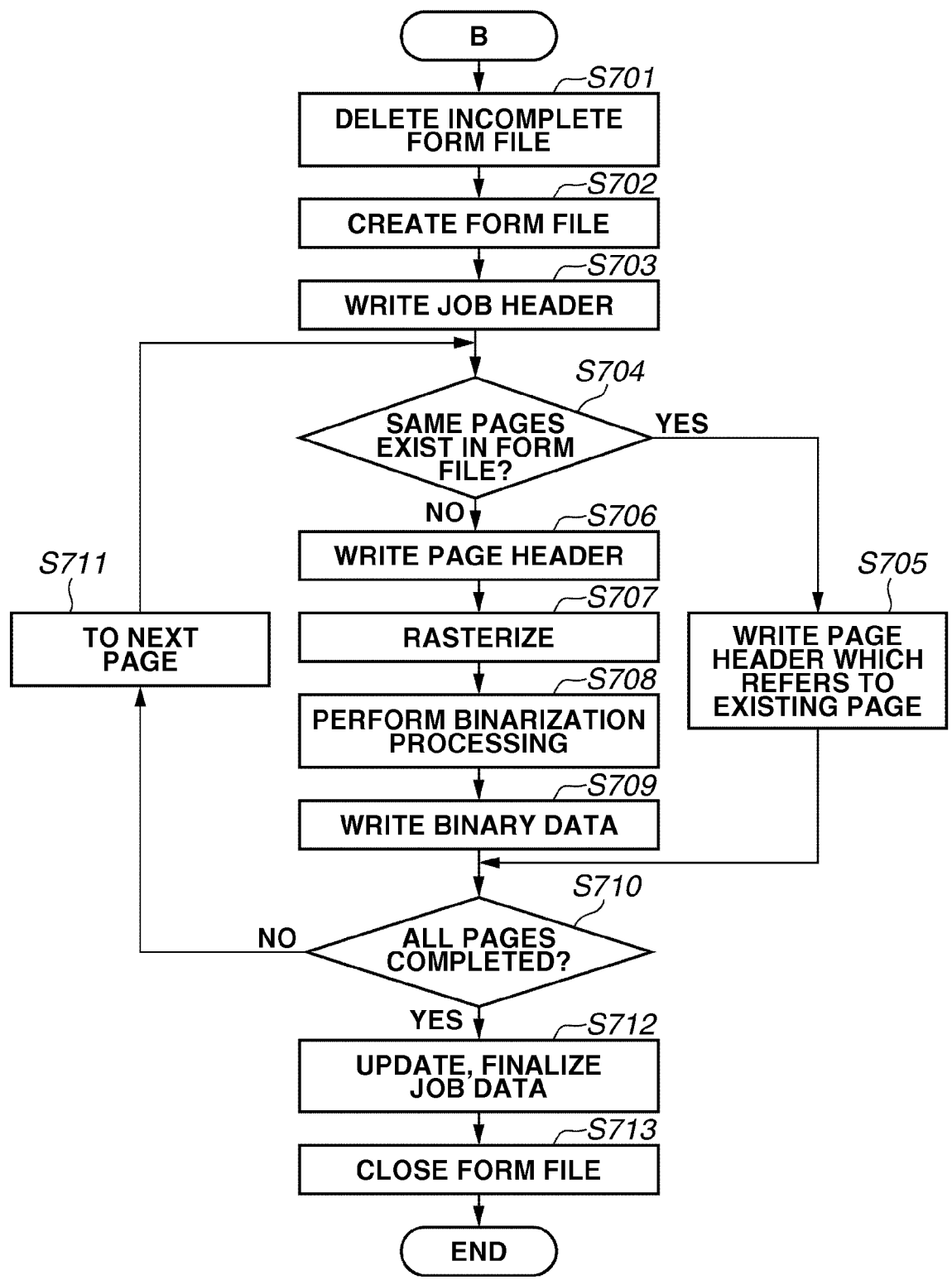
FIG. 7 is a flowchart illustrating form file creation processing of the command generation module.

Here, the command generation module 225 is assumed to determine that $2^{nd}$ transparent ink removed region information is the same as the $1^{st}$ in step S704 in FIG. 7. In such a case, a front-end value of the $1^{st}$ transparent ink removed region information 1114 is stored, in a page data position as one of elements of the $2^{nd}$ page header 1115. Such a page header in the form of referring to existing page is created according to step S705 in FIG. 7. Thereafter, the page header, and the transparent ink removed region information are repetitively stored when needed.

Figure 8:
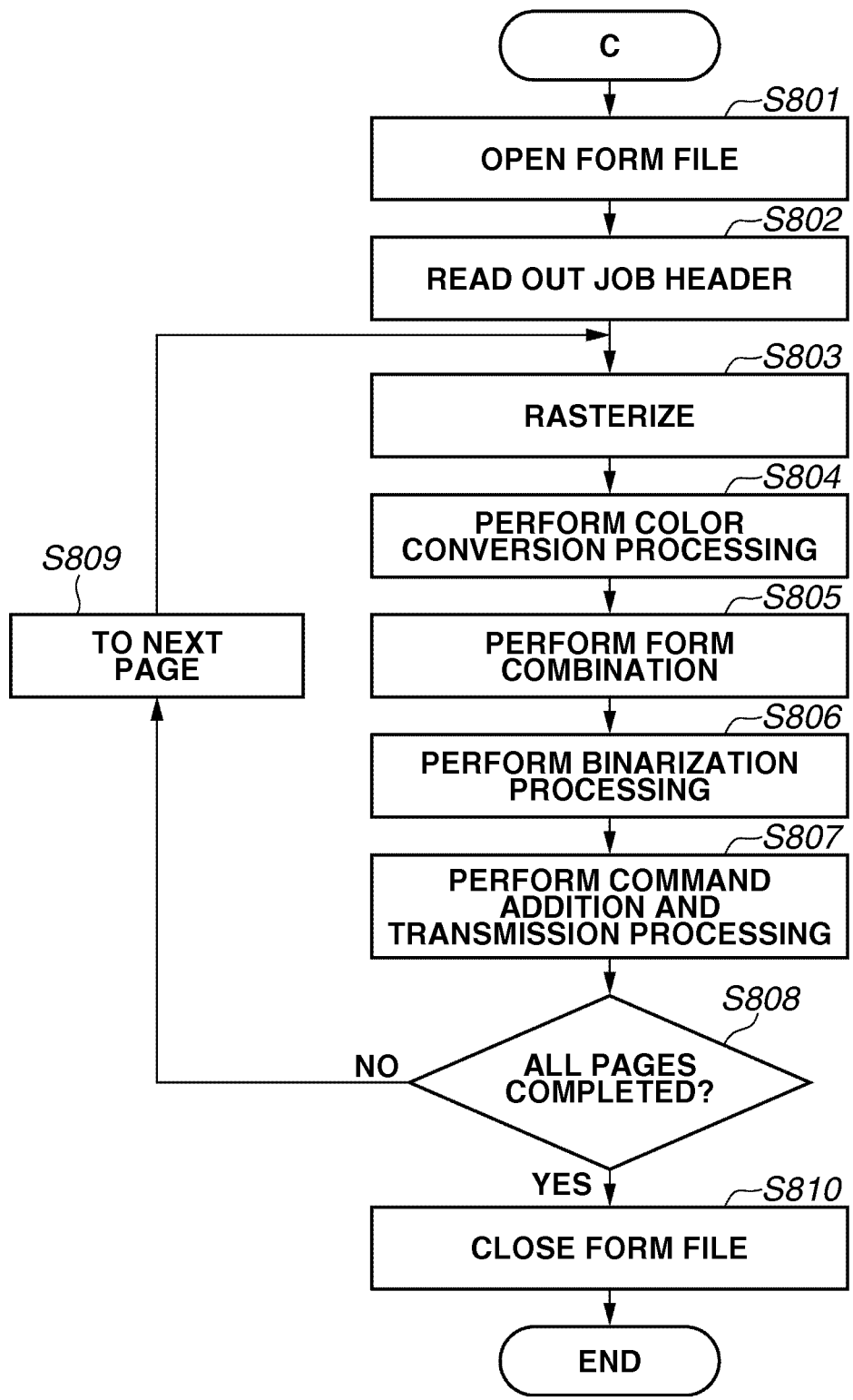
FIG. 8 is a flowchart illustrating form combination print processing of the command generation module.

With reference to FIG. 8, the form combination print processing which the command generation module 225 performs in step S407 will be described in detail. First, in step S801, the command generation module 225 opens a form file. Then, in step S802, the command generation module 225 reads out a job header which is stored at the front end of the form file. Next, in step S803, the command generation module 225 rasterizes the current page, then in step S804, performs color conversion processing. These processing (steps S803 and S804) are equivalent to the processing in steps S601 and S602 in FIG. 6. In step S804, the command generation module 225 creates a transparent ink plane by a method equivalent to the coating method "whole surface" of transparent printing.

Next, in step S805, the command generation module 225 removes the transparent ink according to the transparent ink removed region of the current page, from the transparent ink plane information in step S804. Thereafter, in step S806, the command generation module 225 performs binarization processing, then in step S807, performs command addition and transmission processing. These processing is equivalent to the processing in steps S603 and S604 in FIG. 6. Finally, in step S809, the command generation module 225 determines whether all pages are completed in step S808, and advances the processing to the next page if the remaining pages are present. When the remaining pages are not present, then in step S810, the command generation module 225 closes the form file opened in step S801, and terminates the processing.

As described above, a print job for creating the form file generated by the command generation module 225 is presented as printing which is not output to the printing apparatus 2. However, the printing which is not output to the printing apparatus 2 is not limited to this.

Figure 9:
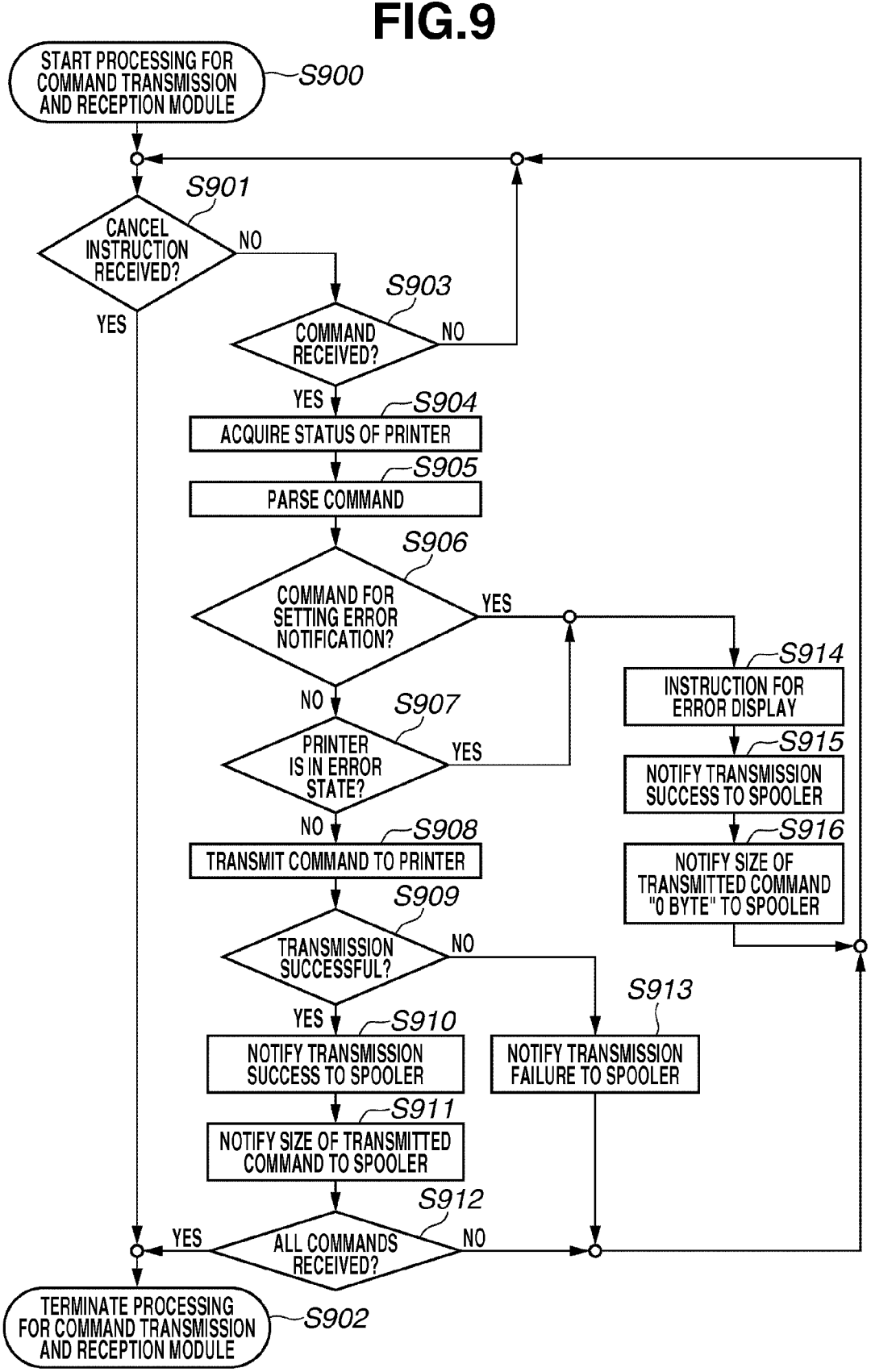
FIG. 9 is a flowchart illustrating processing of a command transmission and reception module.

FIG. 9 is a flowchart illustrating processing of the command transmission and reception module 226. In step S900, the command transmission and reception module 226 starts the processing by being called from the spooler 212.

In step S901, the command transmission and reception module 226 checks whether a cancel instruction of the print job is given from the spooler 212. If a cancel instruction of the print job has been given from the spooler 212 (YES in step S901), then in step S902, the command transmission and reception module 226 terminates the processing. If a cancel instruction of the print job has not been given (NO in step S901), then in step S903, the command transmission and reception module 226 checks whether the command has been received. If the command has not been received (NO in step 903), the command transmission and reception module 226 returns to the processing in step S901 to wait for a command reception. If it is determined that the command has been received (YES in step 903) in the determination in step S903, then in step S904, the command transmission and reception module 226 acquires a status of the printer 230. Subsequently, in step S905, the command transmission and reception module 226 parses the received command, and interprets the command.

Next, in step S906, the command transmission and reception module 226 determines whether the command is a setting error notification command. More specifically, the command transmission and reception module 226 is an example of a setting error detection unit that detects setting errors. If the command is not a setting error notification command (NO in step S906), then in step S907, the command transmission and reception module 226 determines whether the printer 230 is in an error state, from the status of the printer 230 acquired in step S904. More specifically, the command transmission and reception module 226 is an example of an apparatus error detection unit that detects an apparatus error. If the printer 230 is not in the error state (NO in step S907), then in step S908, the command transmission and reception module 226 transmits the command to the printer 230.

Subsequently, in step S909, the command transmission and reception module 226 determines whether command transmission to the printer 230 is successful. If the command transmission has been successful (YES in step S909), then in step S910, the command transmission and reception module 226 notifies the spooler 212 that the command transmission has been successful. At the same time, in step S911, the command transmission and reception module 226 notifies a size of the command transmitted to the printer 230, to the spooler 212.

Subsequently, in step S912, the command transmission and reception module 226 determines whether all commands have been completely received. If it is determined that all commands have not been received (NO in step S912), the command transmission and reception module 226 returns the processing to step S901, and continues the processing until all commands are completely received. If it is determined that all the commands have been completely received in the determination in step S912 (YES in step S912), then in step S902, the command transmission and reception module 226 terminates the processing.

In step S913, if the command transmission and reception module 226 determines that the command transmission to the printer 230 has failed in the determination in step S909 (NO in step S909), it notifies the command transmission failure to the spooler 212, and returns the processing to step S901. Further, if the command transmission and reception module 226 determines that the printer 230 is in an error state in the determination in step S907 (YES in step S907), then in step S914, it instructs the status information display module 227 to perform error display. The processing of the status information display module 227 will be described below.

The processing in which the command transmission and reception module 226 recognizes that the command is a setting error notification command in the determination in step S906 will be described in detail using FIG. 14.

Figure 14:
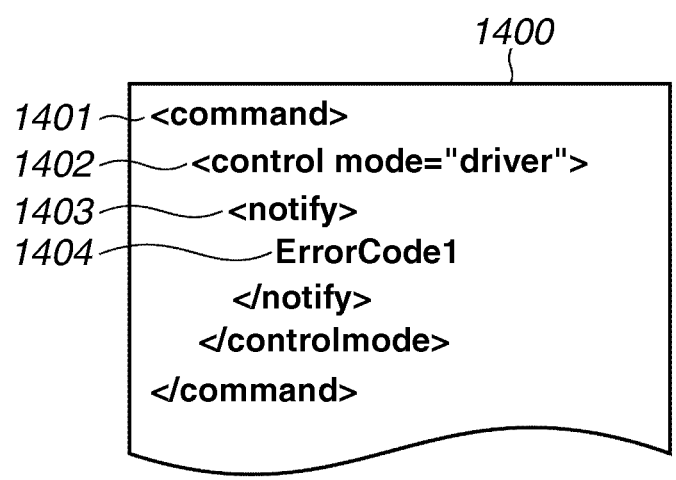
FIG. 14 illustrates data structure of a setting error notification command.

FIG. 14 illustrates a data structure of the setting error notification command. A <command> element (1401) indicates a start of the command. A <control mode="driver"> element (1402) indicates a target which the command controls. An attribute value of "driver" is set to mode attribute of control tag of the element 1402. In other words, it indicates that this command is a command for controlling the "driver". In a <notify> element (1403), notification content is specifically written. TO data of the <notify> element (1403), an Error Code 1 (1404) is set. When the command transmission and reception module 226 confirms the Error Code 1 (1404), it recognizes that the command indicates a setting error.

When the command transmission and reception module 226 determines that the command is a setting error notification command in the determination 906, it instructs the status information display module 227 to display an error in step S914. The processing of the status information display module 227 will be described below. In step S915, the command transmission and reception module 226 notifies the spooler 212 that transmission has been successful. Subsequently, in step S916, the command transmission and reception module 226 notifies the spooler 212 that a size of the command transmitted to the printer 230 is "0 byte".

By the command transmission and reception module 226 performing the processing in steps S915 and S916, the printer driver 220 is enabled to perform error display, without causing the spooler 212 to recognize that the processing of the print job has failed. Further, by the command transmission and reception module 226 performing the processing in steps S915 and S916, the printer driver 220 is enabled to reserve the processing of the print job until a user operates the operation unit on the error display.

Figure 10:
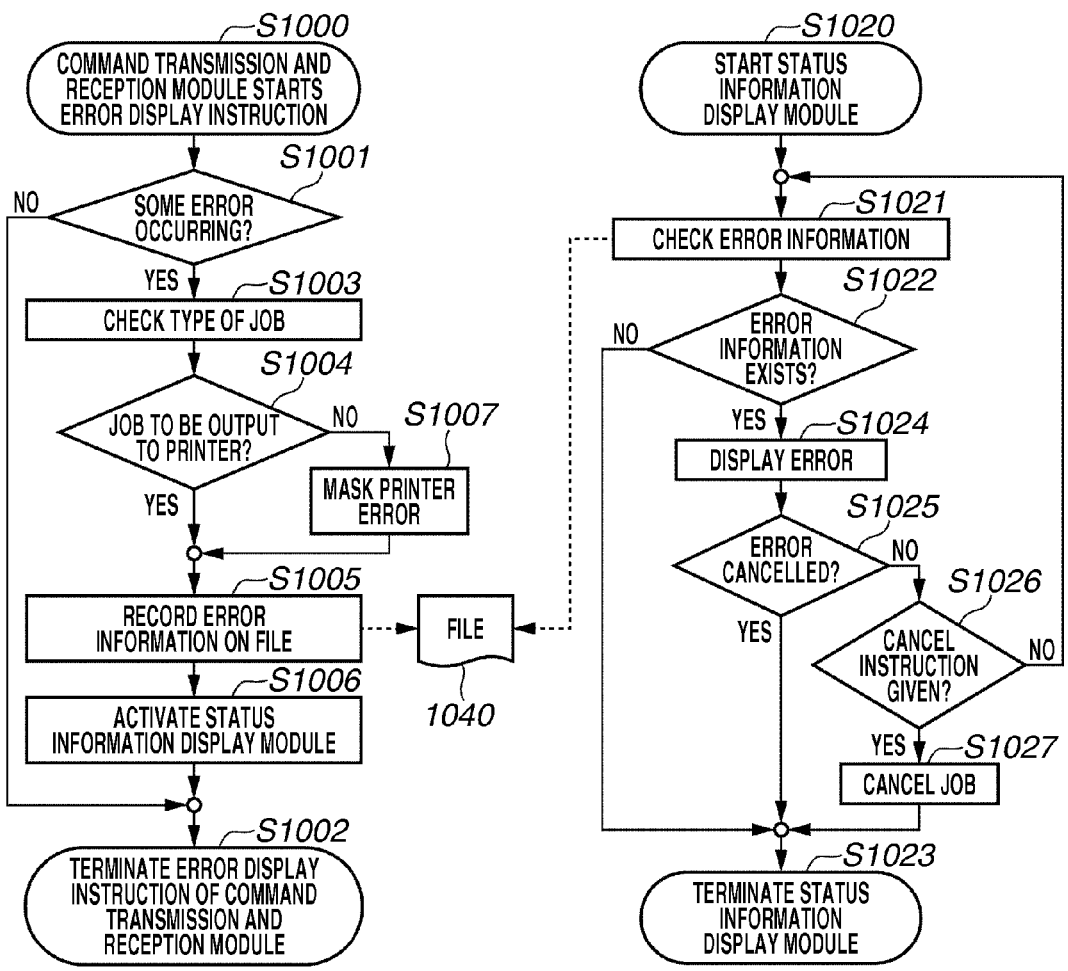
FIG. 10 is a flowchart illustrating an error display instruction of the command transmission and reception module, and status display processing of a status information display module.

FIG. 10 is a flowchart illustrating an error display instruction of the command transmission and reception module 226, and status display processing of the status information display module 227. Using FIG. 10, processing of selecting errors to be notified to the status information display module 227 by the command transmission and reception module 226, and error display processing of the status information display module 227 will be described in detail.

In step S1000, the command transmission and reception module 226 starts error display instruction processing. Then, in step S1001, the command transmission and reception module 226 determines whether some error is occurring. Some error refers to an error of the printer 230 determined in the determination in step S907, or a setting error of the print job determined in the determination in step S906. If it is determined that no error is occurring in the determination in step S1001 (NO in step S1001), then in step S1002, the command transmission and reception module 226 terminates error display instruction processing.

If it is determined that some error is occurring in the printer 230 in the determination in step S1001 (YES in step S1001), then in step S1003, the command transmission and reception module 226 checks for a type of the print job. The type of print job may be determined by the command transmission and reception module 226 from the setting information of the print data, or may be determined by the command generation module 225 on upstream side or the page configuration module 222 upon receiving a notification. If it is determined as a print job to be output to the printer 230 in the determination in step S1004 (YES in step S1004), then in step S1005, the command transmission and reception module 226 writes in a file 1040 an error of the printer 230 and a setting error of the print job.

FIG. 12A shows that a cover open error (1201) as an error of the printer 230, and a setting error B (1202) as a setting error of the print job are written in a file 1200 (1040). Setting error B refers to an error determined on the basis of a command which the command transmission and reception module 226 has received and on the basis of specification of the printer 230. Here, an error is described as an example in which a size of the printing medium indicated in the command is not a size of a printing medium usable in a sheet feed port (not illustrated) of the printer 230. In a case of a print job to be output to the printer 230, either of the error of the printer 230 and the setting error of the print job, to whichever a priority is given, may be notified to the user.

In step S1005, error information is recorded in the file 1040. After that, in step S1006, the command transmission and reception module 226 activates the status information display module 227, then in step S1002, terminates the processing. In the determination in step S1004, if it is determined that a print job is not to be output to the printer 230 (NO in step S1004), then in step S1007, the command transmission and reception module 226 masks the error (printer error) of the printer 230.

In the present exemplary embodiment, as a method for communication between processes of modules each other, a file sharing will be described by way of an example. In step S1005, the command transmission and reception module 226 writes error information in the file 1040. Communication processing between different processes is realized by the status information display module 227 loading the file 1040. The processing of the status information display module 227 will be described below.

If it is determined that a print job is not to be output to the printer 230 in the determination in step S1004, the command transmission and reception module 226 performs the processing in step S1007 for masking the error of the printer 230. After having executed mask processing in step S1007, in step S1005, the command transmission and reception module 226 records the remaining error information in the file 1040. Then in step S1006, the command transmission and reception module 226 activates the status information display module 227. After having activated the status information display module 227 in step S1006, then in step S1002, the command transmission and reception module 226 terminates the processing.

Here, the processing in step S1007 will be described in detail with reference to FIGS. 12B through 12D. FIG. 12B illustrates a state in which only a setting error A 1211 is recorded in a file 1210 (1040) by the command transmission and reception module 226. For example, the setting error A indicates an error in a case where the command generation module 225 determines that a form name (form file name) is incorrect in the determination in step S409 made at the time of form file creation. If only the setting error (the setting error A) of the print job has occurred, the command transmission and reception module 226 writes the setting error A 1211 in the file 1040 as error information since the error of the printer 230 does not exist.

FIG. 12C illustrates a state in which a cover open error 1221 has been subjected to mask processing by the command transmission and reception module 226. In a file 1220, a state is written in which the error (the cover open error 1221) of the printer 230 is occurring. Since the cover open error 1221 is an error of the printer 230, the command transmission and reception module 226 masks the cover open error 1221. A file 1225 indicates a state in which error information becomes empty 1226 as the result of mask processing of the error performed by the command transmission and reception module 226.

FIG. 12D illustrates a state in which a cover open error 1231 has been subjected to mask processing by the command transmission and reception module 226. In a file 1230, a state is written in which an error (cover open error 1231) of the printer 230 and a setting error (setting error A 1232) of the print job are occurring. Since the cover open error 1231 is an error of the printer 230, the command transmission and reception module 226 masks the cover open error 1231. A file 1235 indicates a state in which only a setting error A 1236 is recorded, as the result of mask processing of error performed by the command transmission and reception module 226.

In this way, after error information has been recorded in the file 1040 in step S1005, then in step S1006, the command transmission and reception module 226 activates the status information display module 227, and in step S1002, terminates the processing.

Subsequently, the processing of the status information display module 227 activated from the command transmission and reception module 226 in step S1006 will be described. In step S1020, the status information display module 227 starts the processing. Then, in step S1021, the status information display module 227 confirms the file 1040 on which the error information has been recorded.

Figure 13A:
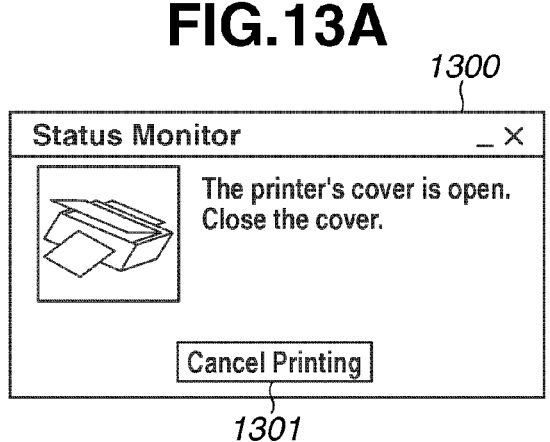
FIGS. 13A, 13B, 13C, and 13D illustrate error screens which the status information display module displays.
Figure 13B:
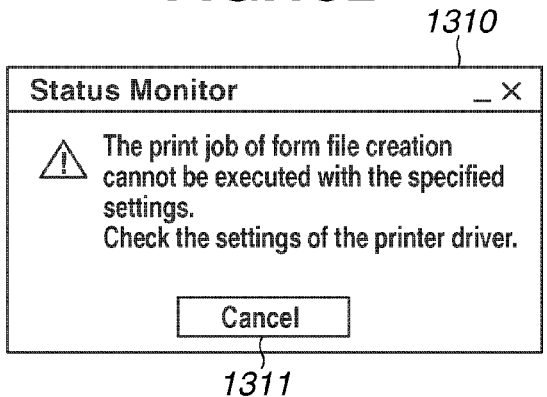

If the error information 1225 in FIG. 12C has been recorded on the file 1040, then in step S1022, the status information display module 227 determines that the error information does not exist (NO in step S1022), and in step S1023, terminates the processing. In the determination in step S1022, if it is determined that error information exists (YES in step S1022), then in step S1024, the status information display module 227 displays the error. If the error information (1210) in FIG. 12B, or the error information 1235 in FIG. 12D has been recorded on the file 1040, the status information display module 227 displays an error screen 1310 as illustrated in FIG. 13B.

If a plurality of errors is described like the error information 1200 in FIG. 12A, the status information display module 227 may adopt specifications that give priority to the display of an error at the front end. In that case, the status information display module 227 displays the error screen 1300 as illustrated in FIG. 13A.

The status information display module 227, after displaying an error in step S1024, checks whether the error has been cancelled in step S1025. The status information display module 227 confirms, for example, the error screen 1300 in FIG. 13A, and checks whether the user has closed a cover of the printer 230. For example, information that the user has closed the cover of the printer 230, is notified from the printer 230 to the status information display module 227 via the command transmission and reception module 226. In the determination in step S1025, if it is determined that the error has been cancelled (YES in step S1025), then in step S1023, the status information display module 227 terminates the processing.

In the determination in step S1025, if it is determined that the error has not been cancelled, (NO in step S1025), then in step S1026, the status information display module 227 checks whether job cancel instruction is given from the user. The job cancel instruction is conveyed to the status information display module 227, in response to the user depressing a "Cancel Printing" button 1301 displayed on the error screen 1300 in FIG. 13A, or a "Cancel" button 1311 displayed on the error screen (1310) in FIG. 13B.

If a job cancel instruction has not been given from the user (NO in step S1026), the status information display module 227 returns to step S1021. If job cancel instruction has been given from the user (YES in step S1026), then in step S1027, the status information display module 227 implements job cancel processing, and after that, in step S1023, terminates the processing.

The status information display module 227 may request the spooler 212 to perform job cancel by utilizing application programming interface (API) which the OS provides. Alternatively, the status information display module 227 performs cancel notification to the command transmission and reception module 226 as communication between processes. Then, the command transmission and reception module 226 may terminate the print job, by notifying the spooler 212 that the command size received in the determination in step S903 has been transmitted to the printer 230.

As described above, the command transmission and reception module 226 masks an error no to be displayed depending on a type of the print job, and notifies the error to the status information display module 227. Accordingly, it becomes possible for the status information display module 227 to notify appropriate error information to the user.

Further, in the present exemplary embodiment, a configuration is described in which the printer driver 220 transfers no data to the printer 230 in a case of a print job which is not transmitted to the printer 230. However, the printer driver 220 may transfer data for the purpose of communication establishment with the printer 230, or communication check. Even in such a case, with the configuration in which the printer driver 220 does not transmit to the printer 230 a command such as print instruction on a printing medium, the objectives of the present invention can be fulfilled.

Hereinbelow, a second exemplary embodiment will be described. In the printer driver 220 that notifies all detected errors to the user, specifications for listing errors according to priority of errors which should be notified by the status information display module 227 are assumed. In this case, even when the processing of the print job which is not to be transmitted to the printer 230 is in progress, it is difficult for the printer driver 220 to employ processing for neglecting the error of the printer 230. In a second exemplary embodiment, a method for solving this issue will be described in detail using FIGS. 12A-13D and 15.

Figure 15:
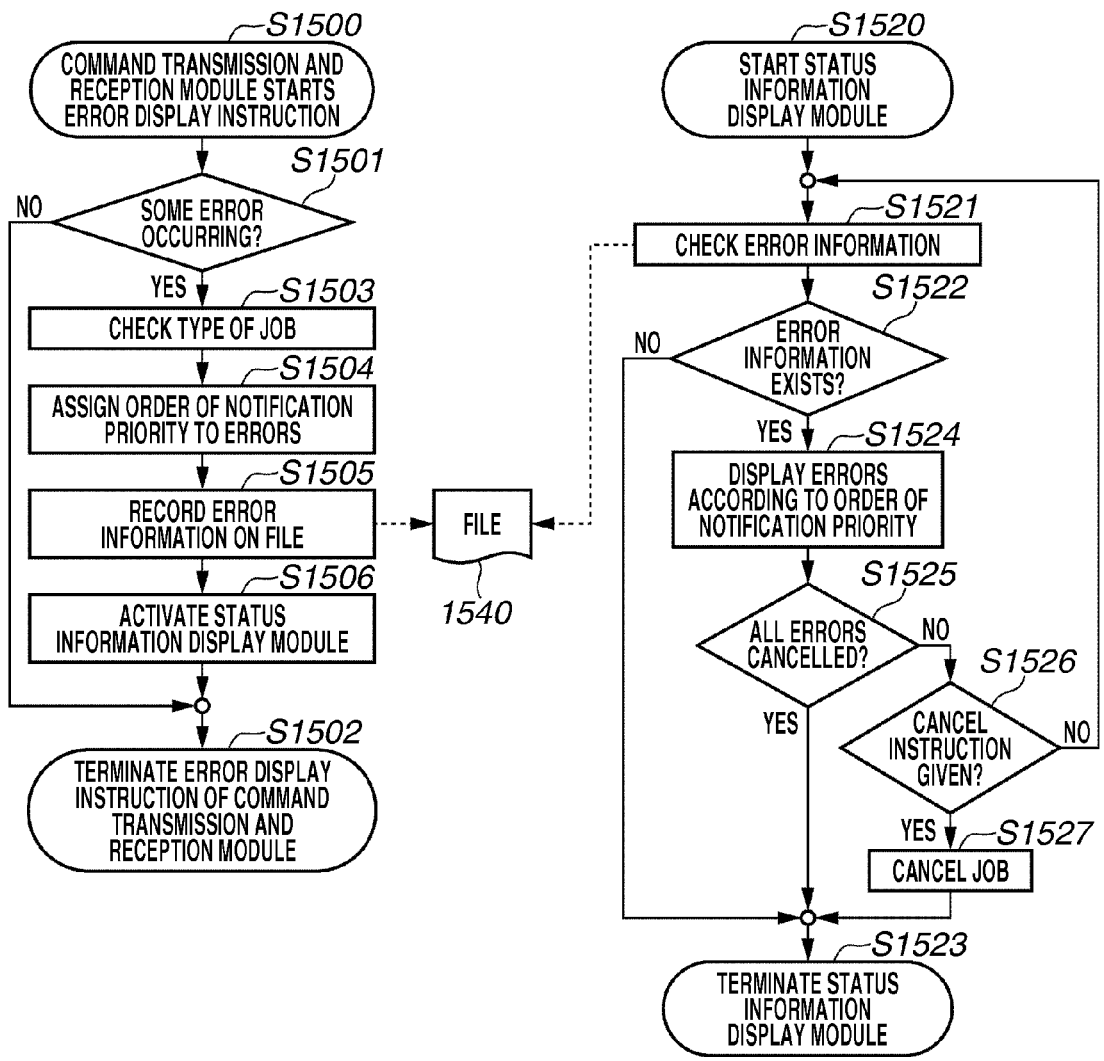
FIG. 15 is a flowchart illustrating an error display instruction of the command transmission and reception module, and status display processing of the status information display module.

FIG. 15 is a flowchart illustrating error display instruction of the command transmission and reception module 226, and status display processing of the status information display module 227. Using FIG. 15, processing of the command transmission and reception module 226 for assigning an order of notification priority to errors, to the status information display module 227, and error display processing according to the orders of notification priority of the status information display module 227 will be described in detail.

In step S1500, the command transmission and reception module 226 starts error display instruction processing, then in step S1501, determines whether some error is occurring. Some error refers to an error of the printer 230 determined in the determination in step S907, or a setting error of the print job determined in the determination in step S906. If it is determined that no error is occurring, in the determination in step S1501 (NO in step S1501), then in step S1502, the command transmission and reception module 226 terminates the error display instruction processing.

In the determination in step S1501, if the command transmission and reception module 226 determines that some error is occurring in the printer 230 (YES in step S1501), then in step S1503, it checks for a type of the print job. The type of the print job may be configured such that the command transmission and reception module 226 determines from setting information of print data, or may be configured such that the command transmission and reception module 226 determines upon receiving notification from the command generation module 225 on upstream side or the page configuration module 222.

In step S1504, the command transmission and reception module 226 assigns the order of notification priority to errors, depending on the type of print job checked in step S1503. After the order of notification priority has been assigned to the errors according to step S1504, then in step S1505, the command transmission and reception module 226 records the error information on the file 1540. Thereafter, in step S1506, the command transmission and reception module 226 activates the status information display module 227, then in step S1502, terminates the processing.

FIGS. 12E and 12F illustrate states in which the orders of notification priority are assigned to errors, and are written into the file 1540 (1240, 1250). The command transmission and reception module 226 assigns orders of notification priority 1241 and 1251 to all errors that are occurring.

If the type of print job checked in step S1503 is a print job not to be output to the printer 230, it is desirable that a setting error of the print job is notified on a priority basis to the user. Thus, a state in which the command transmission and reception module 226 assigns notification priority "1" to the setting error (setting error A) of the print job is indicated in 1242 in FIG. 12E. Subsequently, a state in which the command transmission and reception module 226 assigns a lower notification priority "2" than that of the setting error (setting error A) of the print job, to the error (cover open error) of the printer 230 is indicated in 1243 in FIG. 12E.

On the other hand, if the type of the print job checked in step S1503 is a print job to be output to the printer 230, the command transmission and reception module 226 assigns notification priority "1" to an error (cover open error) of the printer 230, when an error of the printer 230 should be notified to user on a priority basis. This state is indicated in 1252 in FIG. 12F.

Subsequently, a state in which the command transmission and reception module 226 assigns a lower notification priority "2" than that of the error (cover open error) of the printer 230 to the setting error (setting error C) of the print job is indicated in 1253 in FIG. 12F. Setting error C is an error determined on the basis of the command which the command transmission and reception module 226 has received and a state of the printer 230. Here, the type of the printing medium indicated in the command is usable in the sheet feed port (not illustrated) of the printer 230, but an error for indicating a warning in a case where there is separate sheet feed port from which a higher print quality can be obtained, is taken as the example.

Subsequently, the processing of the status information display module 227 activated from the command transmission and reception module 226 in step S1506 will be described. In step S1520, the status information display module 227 starts the processing. Then in step S1521, the status information display module 227 confirms the file 1540 in which error information has been recorded. If error information has not been recorded in the file 1540, the status information display module 227 determines that the error information does not exist (NO in step S1522), then in step S1523, terminates the processing. In the determination in step S1522, if it is determined that the error information exists (YES in step S1522), then in step S1524, the status information display module 227 displays the error.

Figure 13C:
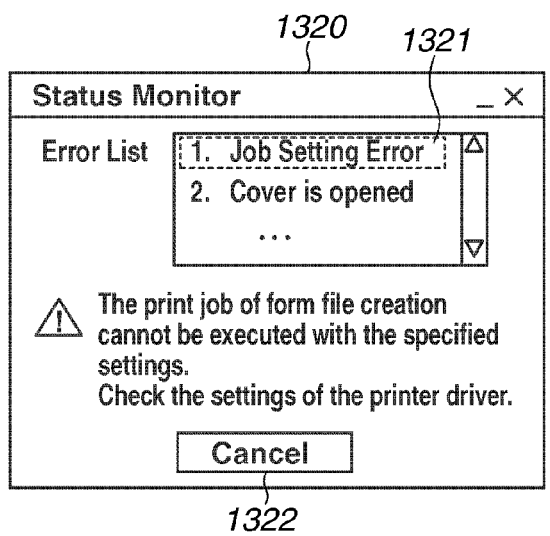

If the error information 1240 in FIG. 12E has been recorded in the file 1540, the status information display module 227 displays an error screen 1320 as illustrated in FIG. 13C. On the error screen 1320, there is a region where an error list is displayed, which indicates a state where a setting error 1321 of the print job with the highest notification priority is selected. On the error screen 1320, detailed description relating to the selected error is displayed. In step S1527, the user can also stop printing by depressing a "Cancel" button 1322.

Figure 13D:
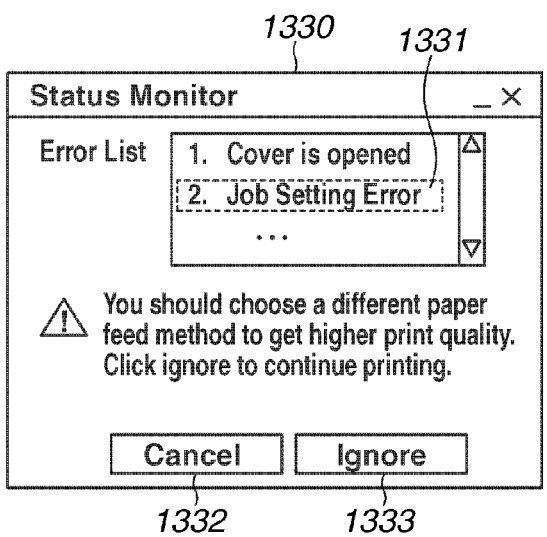

On the other hand, if the error information 1250 in FIG. 12F is recorded in the file 1540, the status information display module 227 displays an error screen 1330 as illustrated in FIG. 13D.

The error screen 1330 indicates a state in which an error (cover open error) of the printer 230 is occurring as an error with the highest notification priority. In addition, the error screen 1330 indicates a state in which a setting error 1331 of the print job with the second highest notification priority is selected. On the error screen 1330, detailed description relating to the selected error is displayed. In step S1527, the user can also stop printing by depressing a "Cancel" button 1332. Also, the user can neglect the error by depressing an "Ignore" button 1333, and continue printing.

In step S1524, the status information display module 227 displays errors. After that, in step S1525, the status information display module 227 checks whether all errors have been cancelled. In the determination in step S1525, if it is determined that all errors have been cancelled (YES in step S1525), then in step S1523, the status information display module 227 terminates the processing. In the determination in step S1525, if it is determined that errors have not been cancelled (NO in step S1525), then in step S1526, the status information display module 227 checks whether a job cancel instruction has been given from the user. The job cancel instruction is conveyed to the status information display module 227 in response to the user depressing the "Cancel" buttons 1322 and 1332 displayed on the error screen 1320 in FIG. 13C, and the error screen 1330 in FIG. 13D.

In step S1526, if the job cancel instruction has not been given from the user (NO in step S1526), the status information display module 227 returns the processing to step S1521. In step S1526, if the job cancel instruction has been given from user (YES in step S1526), then in step S1527, the status information display module 227 implements job cancel processing, and thereafter in step S1523, terminates the processing.

As described above, the command transmission and reception module 226 controls an order of priority of errors to be notified, depending on a type of the print job and notifies the status information display module 227, thereby the status information display module 227 can notify appropriate error information to the user.

In the exemplary embodiments so far, an example of the printer driver 220 in which information is notified to the user only when a print job exists is described. However, the present invention can also be applied to the printer driver 220 which monitors at all times information of the printer 230, and notifies it to the user, as a third the exemplary embodiment.

The objectives of the present invention are achieved by supplying to a system or an apparatus, a recording medium which has recorded a program code of a software for implementing the functions of the above-described exemplary embodiments as a fourth exemplary embodiment, and by causing a computer (or a CPU, a micro-processing unit (MPU), and/or the like) of the system or the apparatus to read out and execute the program code stored in the recording medium. In this case, the program code itself readout from the storage medium implements the functions of the above-described exemplary embodiments, and the storage medium that has stored the program code constitutes the present invention.

As a storage medium for supplying the program code, for example, a flexible disk, a hard disk, an optical disk, a magneto-optical disk, a compact disk ROM (CD-ROM), a CD recordable (CD-R), a magnetic tape, a nonvolatile memory card, a ROM, and a digital versatile disk (DVD) can be used.

Further, the functions of the above-described exemplary embodiments are implemented not only by executing a program code which the computer reads out, but also by an operating system (OS) or the like running on the computer, which performs a part of or the whole of actual processing according to instructions of the program code. Needless to say, in such a case, such program code is included in the present invention.

Furthermore, the functions of the above-described exemplary embodiments are implemented by performing a part of or the whole of the actual processing by a CPU or the like provided in a function expansion board inserted into the computer or in a function expansion unit connected to the computer, according to instructions issued by the program code that is readout from the storage medium after written to a memory provided on the function expansion board or on the function expansion unit. Needless to say, in such a case, such program code is included in the present invention.

The present invention can also be realized by executing the following process. That is, a process in which a software (program) that implements the functions of the above-described embodiments is supplied to the system or apparatus via a network or a recording medium of various types, and then a computer of the system or apparatus (or devices such as a CPU, an MPU, and/or the like) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-194152 filed Aug. 31, 2010, which is hereby incorporated by reference herein in its entirety.

What is claimed is:

1. An information processing apparatus that processes jobs, the information processing apparatus comprising:
a generation unit configured to generate a print command corresponding to a job in which print output is performed in a printing apparatus;
a transmission and reception unit configured to transmit the generated print command to the printing apparatus and to receive information of occurrence of a first error in the printing apparatus from the printing apparatus; and
a display unit configured to perform control such that the received information included in a file recorded by the transmission and reception unit is displayed when a job in which print output is performed in the printing apparatus is processed in the information processing apparatus,
wherein, when a job in which print output is not performed in the printing apparatus is processed in the information processing apparatus, the transmission and reception unit masks the received information in the file such that a display of the received information by the display unit is not performed, and
wherein the job in which print output is not performed in the printing apparatus includes a job for creating a form.

2. The information processing apparatus according to claim 1, further comprising:
an error detection unit configured to detect a second error related to one or more settings of a job,
wherein, according to a detection of both the first error and the second error about the job in which print output is not performed in the printing apparatus, the display unit is further configured to display information of the second error, and not to display information of the first error.

3. The information processing apparatus according to claim 1,
wherein the generation unit is further configured to generate a print command corresponding to a print job subjected to printing operation using the form stored in a storage section and designated by a user operation.

4. The information processing apparatus according to claim 1, wherein the form is used for identifying a print region of transparent ink in the printing apparatus.

5. The information processing apparatus according to claim 1, wherein the first error includes a cover open error.

6. The information processing apparatus according to claim 1, further comprising:
a creation unit configured to create a form based on the job for creating the form, and a storage unit configured to store the form created by the creation unit in a storage section of the information processing apparatus.

7. The information processing apparatus according to claim 1, wherein the transmission and reception unit is configured to comprise a determination unit configured to determine, based on setting information of a job or a notification from an upstream module related to a processing of the job, the job to be a job in which print output is not performed in the printing apparatus, wherein the transmission and reception unit masks the received information in the file when the job determined to be a job in which print output is not performed in the printing apparatus by the determination unit is processed in the information processing apparatus.

8. A method for controlling a display relating to processing of jobs, the method comprising:

generating a print command corresponding to a job in which print output is performed in a printing apparatus;

transmitting the generated print command to the printing apparatus;

receiving information of occurrence of a first error in the printing apparatus from the printing apparatus; and performing control such that the received information included in a file, recorded after the receiving, is displayed when a job in which print output is performed in the printing apparatus is processed in the information processing apparatus, wherein, when a job in which print output is not performed in the printing apparatus is processed in the information processing apparatus, after the receiving, masking the received information in the file such that a display of the received information is not performed, and wherein the job in which print output is not performed in the printing apparatus includes a job for creating a form.

9. The method according to claim 8, further comprising:

error detecting to detect a second error related to one or more settings of a job, wherein, according to detection of both the first error and the second error in which print output is not performed in the printing apparatus, information of the second error is displayed, and information of the first error is not displayed.

10. A non-transitory computer readable storage medium on which is stored a computer program for making a computer execute a method for controlling a display related to a process of a job, the method comprising the steps of:

generating a print command corresponding to a job in which print output is performed in a printing apparatus;

transmitting the generated print command to the printing apparatus;

receiving information of occurrence of a first error in the printing apparatus from the printing apparatus;

performing control such that the received information included in a file, recorded after the receiving, is displayed when a job in which print output is performed in the printing apparatus is processed in the information processing apparatus, wherein, when a job in which print output is not performed in the printing apparatus is processed in the information processing apparatus, after the receiving, masking the received information in the file such that a display of the received information is not performed, and wherein the job in which print output is not performed in the printing apparatus includes a job for creating a form.

* * * * *